US012565572B2

(12) United States Patent
Sim et al.

(10) Patent No.: US 12,565,572 B2
(45) Date of Patent: Mar. 3, 2026

(54) METHOD FOR PREPARING POLYISOCYANATE COMPOSITION

(71) Applicant: Hanwha Solutions Corporation, Seoul (KR)

(72) Inventors: Yujin Sim, Daejeon (KR); Juyoung Park, Daejeon (KR); Byeong Hyeon Lee, Daejeon (KR); Sanghyun Cho, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 809 days.

(21) Appl. No.: 17/637,147

(22) PCT Filed: Aug. 20, 2020

(86) PCT No.: PCT/KR2020/011088
§ 371 (c)(1),
(2) Date: Feb. 22, 2022

(87) PCT Pub. No.: WO2021/040316
PCT Pub. Date: Mar. 4, 2021

(65) Prior Publication Data
US 2022/0306835 A1       Sep. 29, 2022

(30) Foreign Application Priority Data

Aug. 23, 2019    (KR) ........................ 10-2019-0103735

(51) Int. Cl.
*C08K 5/13*         (2006.01)
*C08G 18/08*        (2006.01)
*C08G 18/32*        (2006.01)
*C08G 18/76*        (2006.01)

(52) U.S. Cl.
CPC .............. *C08K 5/13* (2013.01); *C08G 18/089* (2013.01); *C08G 18/3206* (2013.01); *C08G 18/7642* (2013.01)

(58) Field of Classification Search
None
See application file for complete search history.

(56) References Cited

U.S. PATENT DOCUMENTS

| | | | |
|---|---|---|---|
| 5,175,349 | A | 12/1992 | Gupta et al. |
| 5,194,559 | A * | 3/1993 | Okazaki ................. C08G 18/70 528/65 |
| 5,302,749 | A | 4/1994 | Nagata et al. |
| 5,502,150 | A * | 3/1996 | Steppan ............. C08G 18/6535 521/126 |
| 2014/0374976 | A1 * | 12/2014 | Yang .................. C08G 18/7678 521/88 |

FOREIGN PATENT DOCUMENTS

| | | | |
|---|---|---|---|
| CN | 1806002 | | 7/2006 |
| CN | 105164175 | | 12/2015 |
| CN | 107636033 | | 1/2018 |
| EP | 3252096 | | 12/2017 |
| EP | 3252096 | A1 * | 12/2017 |
| JP | 2-228317 | | 9/1990 |
| JP | 8-291129 | | 11/1996 |
| JP | 2002-037830 | | 2/2002 |
| JP | 2005-036134 | | 2/2005 |
| JP | 2005-170793 | | 6/2005 |
| JP | 2005-298365 | | 10/2005 |
| JP | 2009-221477 | | 10/2009 |
| JP | 2012-506465 | | 3/2012 |
| JP | 2014-218585 | | 11/2014 |
| JP | 2017-222812 | | 12/2017 |
| JP | 2019-059823 | | 4/2019 |
| JP | 6495449 | | 4/2019 |
| KR | 10-2015-117286 | | 10/2015 |
| KR | 10-1902724 | | 10/2018 |
| KR | 10-2019-0005267 | | 1/2019 |
| KR | 10-1935032 | | 1/2019 |

OTHER PUBLICATIONS

EP 3252096A1, 2012, Machine translation (Year: 2012).*

* cited by examiner

*Primary Examiner* — Satya B Sastri
(74) *Attorney, Agent, or Firm* — LEX IP MEISTER, PLLC

(57) ABSTRACT
There is provided a method for preparing a polyisocyanate composition capable of improving transparency of a product, by mixing a phenol-based stabilizer in an amount of 1 to 1000 ppmw, based on the total weight of aromatic diisocynate, and then, introducing polyhydric alcohol to conduct a polymerization reaction, thereby inhibiting coloration and whitening due to oxygen or moisture during synthesis and purification processes.

7 Claims, No Drawings

METHOD FOR PREPARING POLYISOCYANATE COMPOSITION

CROSS-REFERENCE TO RELATED APPLICATION(S)

This application claims the benefit of Korean Patent Application No. 10-2019-0103735 filed on Aug. 23, 2019 with the Korean Intellectual Property Office, the disclosures of which are herein incorporated by reference in their entirety.

TECHNICAL FIELD

The invention relates to a method for preparing a polyisocyanate composition, wherein coloration and whitening due to oxygen or moisture are inhibited during synthesis and purification processes, thus improving transparency of a product.

BACKGROUND ART

Isocyanate is raw material of polyurethane, and is being variously used as coating, pressure sensitive adhesive/adhesive, coating, foam, and optical material, and the like.

In the case of polyurethane used in an optical field requiring excellent appearance characteristics, particularly transparency, less coloration is required. For this, it is important that coloration does not occur during a polyurethanization reaction, and besides, coloration of raw material isocyanate, particularly difunctional or multifunctional isocyanate does not occur.

However, since isocyanate has high reactivity, it is easily oxidized by oxygen in the air and degenerated or colored, and coloration or whitening occurs even in optical products such as urethane lens applying the same. And, when preparing polyisocyante by polymerization of diisocyanate, specifically when preparing polyurethane by the urethanization reaction of diisocyanate with polyhydric alcohol, polymer is also easily colored by a catalyst or a solvent used in the polymerization reaction.

Thus, as a method for inhibiting coloration in isocyanate, polyisocyanate, and a product prepared using the same, various methods including a method of preparing and storing while sealing with nitrogen gas to block the air, or a method of introducing additives such as UV absorber and storing, and the like have been studied and suggested.

For example, Japanese Patent Application Laid Open No. Heisei2-228317 discloses a method of preparing polyisocyanate for a light-colored polyurethane lacquer, wherein isocyanate is modified and then treated with peroxide, and Japanese Patent Application Laid Open No. 8-291129 discloses a method of preparing isocyanate with reduced coloration by contacting colored isocyanate with ozone-containing gas. And, Japanese Patent Publication No. 2012-506465 discloses a method of preparing isocyanate with reduced coloration, by irradiating light of 200 to 600 nm wavelength to colored isocyanate.

However, the above methods could not realize sufficiently reduced coloration.

As another method, a method of mixing compounds not involved in a polymerization reaction with isocyanate and storing has been suggested, but the added compounds caused coloration when preparing a product later.

Meanwhile, purification by distillation is a common purification method of compounds, but in case isocyanate is heated for distillation, it is colored or degenerated.

Thus, there is a demand for studies on a method for preparing isocyanate, wherein coloration is inhibited, and thus, there is no concern about coloration or degeneration during the subsequent polymer preparation process and distillation process for purification, and furthermore, even during product processing.

DETAILED DESCRIPTION OF THE INVENTION

Technical Problem

It is an object of the invention to provide a method for preparing a polyisocyanate composition that can improve transparency of a product, wherein coloration and whitening of polymer due to oxygen or moisture are inhibited during synthesis and purification processes.

Technical Solution

According to one embodiment of the invention, there is provided a method for preparing a polyisocyanate composition comprising the steps of: mixing aromatic diisocyanate and a phenol-based stabilizer to prepare a monomer composition; and adding polyhydric alcohol having two or more hydroxyl groups in the molecule to the monomer composition and conducting a polymerization reaction, wherein the phenol-based stabilizer is used in an amount of 10 to 1000 ppmw, based on the total weight of the aromatic diisocyanate.

Advantageous Effects

Since the method for preparing a polyisocyanate composition according to the invention mixes diisocyante with a phenol-based stabilizer of optimally controlled content range, before polymerization of diisocynate and polyhydric alcohol, and then, conducts a polymerization reaction with polyhydric alcohol, there is no concern about coloration and whitening of polymer due to oxygen or moisture during synthesis and purification processes, and thus, transparency of a product can be improved.

And, the polyisocyanate composition prepared according to the preparation method, due to excellent properties, may be used in broad fields including paint for plastic, paint for automobiles, film coating, ink, pressure sensitive adhesive/adhesive, sealing material, microcapsules, plastic lens, artificial and synthetic leather, reaction injection molding(RIM) parts, slush powder, elastic molding parts(spandex), urethane foam, and the like, and particularly, it may be used as a pressure sensitive adhesive or an adhesive, due to excellent pressure sensitive adhesion/adhesion of the polyisocyanate composition, and may be also used as optical material requiring excellent appearance characteristics, particularly transparency, such as eyeglass lens, camera lens, prism, and the like, due to inclusion of a stabilizer.

DETAILED DESCRIPTION OF THE EMBODIMENTS

The terms used herein are only to explain specific embodiments, and are not intended to limit the invention. A singular expression includes a plural expression thereof, unless it is expressly stated or obvious from the context that such is not intended.

As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the invention and the invention may have various forms, specific examples will be illustrated and explained in detail below. However, it should be understood that these are not intended to limit the invention to specific disclosure, and that the invention includes all the modifications, equivalents or replacements thereof without departing from the spirit and technical scope of the invention.

Hereinafter, a method for preparing a polyisocyanate composition, a polyisocyante composition prepared thereby, and an article comprising the same according to specific embodiments of the invention will be explained in more detail.

The inventors confirmed that when preparing a polyisocyanate composition by polymerization of aromatic diisocyanate and polyhydric alcohol, in case aromatic diisocyanate is mixed in advance with a compound of a specific structure in a controlled content before the polymerization reaction, coloration of aromatic diisocynate itself may be inhibited, and polymer may be prepared without concern about coloration and discoloration even during the polymerization and distillation process for purification of polyisocyanate, and completed the invention.

Specifically, a method for preparing a polyisocyanate composition according to one embodiment of the invention comprises the steps of:

mixing aromatic diisocyanate and a phenol-based stabilizer to prepare a monomer composition (step 1); and adding polyhydric alcohol having two or more hydroxyl groups in the molecule to the monomer composition and conducting a polymerization reaction (step 2), wherein the phenol-based stabilizer is used in an amount of 10 to 1000 ppmw, based on the total weight of the aromatic diisocyanate.

Explaining each step in detail, the step 1 for the preparation of polyisocyanate polymer is a step of preparing a monomer composition comprising aromatic diisocyanate and a phenol-based stabilizer.

In the aromatic diisocyanate, coloration and discoloration such as whitening may occur due to quinoidization of a benzene ring in the molecule, or adduct generated due to oxygen, moisture or high temperature during the synthesis and purification processes.

In the present disclosure, the phenol-based stabilizer is first mixed with aromatic diisocyanate, and inhibits the above descried side reactions by radical scavenging, thereby preventing coloration and whitening of aromatic diisocyanate and polyisocyanate. Although the phenol-based stabilizer may be introduced during a polymerization reaction, in this case, it may be difficult to sufficiently mix the phenol-based stabilizer and aromatic diisocyanate, and due to insufficient reaction time, it may be difficult to sufficiently realize the effects obtained by the introduction of a stabilizer. Thus, in case the phenol-based stabilizer is introduced during or after a polymerization reaction, coloration and whitening due to high temperature may occur.

Meanwhile, if the content of the stabilizer is less than a certain level, it may be difficult to exhibit sufficient coloration and whitening prevention effect for the aromatic diisocyanate and polyisocyanate, and if it is excessively included greater than a certain level to the contrary, the phenol-based stabilizer itself may cause coloration and whitening. Thus, in the present disclosure, the phenol-based stabilizer is included in an amount of 10 ppmw or more and 1000 ppmw or less, based on the total weight of the aromatic diisocyanate. Preferably, it is included in an amount of 20 ppmw or more, or 25 ppmw or more, and 500 ppmw or less, or 200 ppmw or less, or 100 ppmw or less, based on the total weight of polyisocyanate, thereby realizing further improved coloration and whitening inhibition effect.

The phenol-based stabilizer is phenol or a derivative thereof including a phenol structure in the molecule, and as specific examples, phenol; sterically hindered phenols, such as dibutylhydroxytoluene(BHT), t-butylhydroquinone (TBHQ) butylhydroxyanisole(BHA), pentaerythritol tetrakis[3-(3,5-di-tert-butyl-4-hydroxyphenyl) propionate](Irganox 1010, produced by BASF), thiodiethylene bis[3-(3, 5-di-tert-butyl-4-hydroxyphenyl) propionate](Irganox 1035, produced by BASF), octadecyl-3-(3,5-di-tert-butyl-4-hydroxyphenyl) propionate(Irganox 1076, produced by BASF), N,N'-hexane-1,6-diylbis[3-(3,5-di-tert-butyl-4-hydroxyphenyl)propionamide](Irganox 1098, produced by BASF), benzene propanoic acid, 3,5-bis(1,1-dimethylethyl)-4-hydroxy, C7-C9 side chain alkyl ester(Irganox 1135, produced by BASF), 3,3',3'',5,5',5''-hexa-tert-butyl-a,a',a''-(mesitylene-2,4,6-triyl) tri-p-cresol (Irganox 1330, produced by BASF), ethylene bis(oxyethylene) bis[3-(5-tert-butyl-4-hydroxy-m-tolyl) propionate](Irganox 245, produced by BASF), hexamethylene bis[3-(3,5-di-tert-butyl-4-hydroxyphenyl) propionate](Irganox 259, produced by BASF), 1,3, 5-tris(3,5-di-tert-butyl-4-hydroxybenzyl)-1,3,5-triazine-2-4-6(1H,3H,5H)-trione(Irganox 3114, produced by BASF), 2-[1-(2-hydroxy-3,5-di-tert-pentylphenyl)ethyl]-4,6-di-tert-pentylphenyl acrylate, 2,6-di-tert-butyl-p-cresol, 2,6-diphenyl-4-octadecyloxyphenol, stearyl(3,5-di-tert-butyl-4-hydroxyphenyl)propionate, distearyl(3,5-di-tert-butyl-4-hydroxybenzyl)phosphate, thiodiethylene glycol bis[(3,5-di-tert-butyl-4-hydroxyphenyl)propionate], 1,6-hexamethylene bis[(3,5-di-tert-butyl-4-hydroxyphenyl)propionate], 1,6-hexamethylene bis[(3,5-di-tert-butyl-4-hydroxyphenyl)propionamide], 4,4'-thiobis(6-tert-butyl-m-cresol), 2,2'-methylene bis(4-methyl-6-tert-butylphenol), 2,2'-methylenebis(4-ethyl-6-tert-butylphenol), bis[3,3-bis(4-hydroxy-3-tert-butylphenyl)butyric acid]glycolester, 4,4'-butylidenebis(6-tert-butyl-m-cresol),2,2'-ethylidenebis(4,6-di-tert-butylphenol), 2,2'-ethylidene bis(4-sec-butyl-6-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(3,5-di-tert-butyl-4-hydroxybenzyl)-2,4,6-trimethylbenzene, tetrakis[methylene-3-(3,5-di-tert-butyl-4-hydroxyphenyl)propionate]methane, 2-tert-butyl-4-methyl-6 (2-acryloyloxy-3-tert-butyl-5-methylbenzyl)phenol, 3,9-bis 1,1-dimethyl-2-[(3-tert-butyl-5-methylbenzyl)propionyloxy]ethyl-2,4,8,10-tetraoxaspiro[5,5]undecane, triethyleneglycolbis[(3-tert-butyl-4-hydroxy-5-methylphenyl)propionate], or 6-[3-(3-tert-butyl-4-hydroxy-5-methylphenyl) propoxy]-2,4,8,10-tetra-tert-butyldibenz[d,f][1,3,2] dioxaphosphepine(SUMILIZER GP, produced by Sumitomo); and the like may be mentioned, and among them, one or a mixture of two or more may be used.

Among them, in terms of transparency improvement effect through prevention of coloration and whitening, phenol, dibutylhydroxytoluene, 2-[1-(2-hydroxy-3,5-di-tert-pentylphenyl) ethyl]-4,6-di-tert-pentylphenyl acrylate, octadecyl-3-(3,5-di-tert-butyl-4-hydroxyphenyl) propionate, 6-[3-(3-tert-butyl-4-hydroxy-5-methylphenyl)propoxy]-2,4, 8,10-tetra-tert-butyldibenz[d,f][1,3,2]dioxaphosphepine or a mixture thereof may be preferably used. And, among the mixtures, a mixture of phenol and dibutylhydroxytoluene, more specifically, a mixture comprising phenol and dibutyl-hydroxytoluene at a weight ratio of 10:1 or more, or 5:1 or more, and 5:5 or less, or 5:3 or less may be preferably used.

And, the aromatic diisocyanate is a compound having two isocyanate groups together with an aromatic ring structure in the molecule, and as specific examples, xylylene diisocyanate(XDI), diphenylmethanediisocyanate, bis(isocyanato-phenyl)propane, or diisocyanate anisole, and the like may be mentioned, and among them, one kind of monomers, or two or more kinds of monomers may be used. Among them, considering the effect for improving the inhibition of dis-coloration when used in combination with the phenol-based stabilizer, xylylene diisocyanate(XDI) may be more prefer-able.

The aromatic diisocyanate may be included in the remain-ing parts except the stabilizer, and specifically, it may be included in an amount of 95 wt % or more, or 97 wt % or more, and 99 wt % or less, based on the total weight of the monomer composition comprising the aromatic diisocyanate and stabilizer.

Mixing of the aromatic diisocyanate and phenol-based stabilizer may be conducted by common mixing methods such as stirring, except that the above described content conditions are fulfilled.

And, when mixing the aromatic diisocyanate and phenol-based stabilizer, one or more additives such as a chain extender, a heat stabilizer, a light stabilizer, or a color corrector, and the like, for improving the properties the polyisocyanate composition, may be further introduced within a range where coloration of the composition is not induced.

In the monomer composition prepared through the mixing process of the step 1, due to the phenol-based stabilizer, not only coloration of the aromatic diisocyanate itself may be inhibited, but also coloration of polymer in the polymer composition prepared using the same may be inhibited.

Next, the step 2 is a step of introducing polyhydric alcohol in the monomer composition prepared in the step 1, and conducting a polymerization reaction of aromatic diisocya-nate in the monomer composition and the polyhydric alcohol to prepare polymer.

The polyhydric alcohol is a compound containing two or more hydroxyl groups in one molecule, and specifically, may be a compound having 2 or more, or 3 or more, and 8 or less, or 4 or less hydroxyl groups in the molecule. As specific examples, dihydric alcohol, such as ethyleneglycol, diethyleneglycol, triethyleneglycol, 1,2-propanediol, 1,3-propanediol, 1,2-butanediol, 2-methyl-2,3-butanediol, 1,6-hexanediol, 1,2-hexanediol, and the like; trihydric alcohol, such as glycerol, trimethylolethane, trimethylolpropane (TMP), and the like; tetrahydric alcohol, such as diglycerin, ditrimethylolpropane, pentaerythritol, dipentaerythritol, and the like; pentahydric alcohol, such as L-arabinitol, ribitol, xylitol, and the like; hexahydric alcohol such as D-glucitol, D-mannitol, galactitol, and the like, heptahydric alcohol such as trehalose, and the like; octahydric alcohol such as sucrose, maltose, and the like, or low molecular weight polyol, and the like may be mentioned, and among them, diethylene glycol, glycerol, trimethylolethane, trimethylol-propane or a mixture thereof may be used. More specifically, it may be preferable that trihydric alcohol such as glycerol, trimethylolpropane, or trimethylolethane is used alone, or the trihydric alcohol and other polyhydric alcohol are used in combination.

Meanwhile, the polymerization reaction consists of a urethanization reaction (or condensation polymerization reaction) between isocyanates in the aromatic diisocyanate and hydroxyl groups in the polyhydric alcohol.

Thus, it may be preferable that the amount of the poly-hydric alcohol used may be appropriately determined con-sidering the urethanization reaction with aromatic diisocya-nate, the aimed properties such as viscosity of prepared polyisocyanate, and use of polymer, and the like. Specifi-cally, the polyhydric alcohol may be introduced in an amount such that the mole ratio of hydroxyl groups in the polyhydric alcohol may become 0.1 or more, or 0.15 or more, and 1 or less, or 0.8 or less, based on 1 mole of isocyanate group of the aromatic diisocyanate. If the mole ratio of hydroxyl groups to isocyanate groups is less than 0.1, due to excessive isocyanate groups, the viscosity of the polymer may decrease, and thus, processability may be deteriorated. And, if the mole ratio of hydroxyl groups to isocyanate groups is greater than 1, due to excessive hydroxyl groups, coloration preventing effect may be dete-riorated.

And, the polymerization reaction may be conducted under atmospheric pressure, and inert gas atmosphere such as nitrogen, argon, and the like.

And, it is preferable that the polymerization reaction may be conducted in a temperature range of 40° C. or more, or 60° C. or more, and 100° C. or less, or 80° C. or less, because within this range, reaction speed can be easily controlled without concern about discoloration, and reaction efficiency may be increased.

And, the polymerization reaction may be conducted under non-catalyst condition, or in the presence of a catalyst promoting urethanization such as tin-based or amine-based catalyst. In case it is conducted in the presence of a catalyst, the catalyst may be further introduced when introducing polyhydric alcohol to the monomer composition.

Meanwhile, the degree of progression of the polymeriza-tion reaction may be predicted by measuring the concentra-tion of isocyanate groups in the polymerization reactants by n-dibutylamine method using potentiometric titration device, or measuring refractive index, and in the present disclosure, the polymerization reaction is conducted until the concentration of isocyanate groups in the reactants reaches the calculation value of isocyanate groups remaining after reaction with polyhydric alcohol.

As the result of the above described polymerization reaction, polyisocyanate, specifically polyurethane is pre-pared.

The polyisocyanate specifically comprises urethane bonds formed by the reaction of a part or whole of the isocyanate groups in the aromatic diisocyanate with the hydroxyl groups of the polyhydric alcohol.

And, in the product obtained as the result of the polym-erization reaction, besides the polyisocyanate, a stabilizer that is not involved in the polymerization reaction, and unreacted aromatic diisocyanate exist.

The stabilizer, although remains in the polyisocyanate composition, performs a function for inhibiting discolor-ation and whitening of polymer when the polymer compo-sition is processed, but unreacted aromatic diisocynate may induce discoloration of polymer.

Thus, the method for preparing a polyisocyanate compo-sition according to one embodiment of the invention may optionally further comprise a step of purifying the product obtained after the polymerization reaction is completed, to remove unreacted aromatic diisocyanate.

The purification process may be conducted by common purification methods such as distillation, solvent extraction, and the like, and in the present disclosure, it may be conducted by distillation, such as thin film evaporation, because it has excellent unreacted polyisocynate removal efficiency.

Commonly, since compounds having unsaturated bonds such as aromatic compounds are easily oxidized, there is much concern about coloration. However, in the present disclosure, a stabilizer existing in the product of a polymerization reaction selectively acts to compounds causing coloration, such as oxygen, thus inhibiting coloration of polyisocyanate. And, since a complex produced by the reaction of a stabilizer and coloration causing material is separated and removed during a distillation process, coloration of polyisocyanate may be inhibited even during the distillation process for purification.

The pressure and temperature during the distillation process for purification may be appropriately controlled according to the composition of the polyisocyanate composition, distillation device, and the like. In the present disclosure, the distillation process for purification may be conducted under pressure of 0.001 kPa or more, and 1 kPa or less, or 0.5 kPa or less.

And, the distillation process for purification may be conducted at a temperature of 70° C. or more, or 90° C. or more, and 200° C. or less, or 180° C. or less. If the temperature is less than 70° C., there is a concern about deterioration of distillation/purification efficiency, and if it is greater than 200° C., due to high temperature, there is a concern about modification of polyisocyanate.

Through the distillation process for purification, the content of unreacted aromatic diisocyanate in the polyisocyanate composition may be lowered, which is preferable because the stability of the composition increases as the content of unreacted aromatic diisocyanate is lower.

The polyisocyanate composition prepared by the above preparation method may be used for the preparation of coating, pressure sensitive adhesive/adhesive, paint or foam, and the like, and since coloration and discoloration may be inhibited due to the existence of a stabilizer, it may be usefully used in the field of optical materials requiring excellent appearance characteristics such as transparency.

Thus, according to yet another embodiment of the invention, there is provided a polyisocyanate composition prepared according to the above preparation method.

The polyisocyanate composition specifically comprises polyisocyanate polymer (or polyurethane) produced by the polymerization reaction of aromatic diisocyanate and polyhydric alcohol, and a stabilizer previously mixed with aromatic diisocyanate before the polymerization reaction, and it may optionally further comprise unreacted aromatic diisocyanate remaining in the composition.

Specifically, the polyisocyanate composition has an isocyanate group content(NCO %) in the composition of 10 wt % or more, and 20 wt % or less, or 17 wt % or less, based on the total weight of the composition when diluted to a solid content of 75 wt % through the introduction of ethyl acetate. By having an isocyanate group content within the above range, it may exhibit appropriate crosslinking density, and thus, if the polymer composition is coated, it may exhibit excellent coating forming property.

Meanwhile, in the present disclosure, NCO % may be calculated by neutralization of isocyanate groups with excessive 2N amine, followed by back titration with 1N hydrochloric acid.

And, the content of unreacted aromatic diisocyanate remaining in the polyisocyanate composition, based on the total weight of a solid content, is 1 wt % or less, or 0.5 wt % or less, or 0.3 wt % or less, which is significantly decreased compared to the prior art, and thus, more excellent stability may be exhibited.

And, the polyisocyanate composition may further comprise additives such as an internal mold release agent, a UV absorber, a polymerization initiator, a heat stabilizer, a color corrector, a chain extender, a cross-linking agent, a light stabilizer, filler, and the like, and the content may be appropriately determined within a range where the property of inhibiting coloration and discoloration of the polymer composition is not hindered.

The polyisocyanate composition may be used in broad fields due to excellent properties, and particularly, due to excellent pressure sensitive adhesion/adhesion of the polyisocyanate composition, it may be used as a pressure sensitive adhesive/an adhesive, and due to the inclusion of a stabilizer, it may be also used as optical materials requiring excellent appearance characteristics, particularly transparency, such as eyeglass lens, camera lens, plastic lens, prism, and the like.

Thus, according to yet another embodiment of the invention, there is provided an article comprising the above polymer composition, or prepared using the polymer composition.

Wherein, the article may be paint, such as paint for plastic or paint for automobiles; coating such as film coating; ink; a pressure sensitive adhesive; an adhesive; sealing material; microcapsules; artificial leather such as man-made leather, or synthetic leather; reaction injection molding(RIM) parts; slush powder; elastic molding parts(spandex); urethane foam; or optical material, such as eyeglass lens, camera lens, plastic lens, prism, and the like.

Hereinafter, the actions and effects of the invention will be explained in detail through specific examples. However, these examples are presented only as the illustrations of the invention, and the scope of the right of the invention is not determined thereby.

Example 1

Under nitrogen atmosphere, 1500 g of m-xylylene diisocyanate(XDI) was introduced into a round bottom flask, and based on the total weight of XDI, 25 ppmw of phenol was additionally introduced as a stabilizer, and then, the mixture was stirred to prepare a monomer composition. The temperature of the flask was raised to 70° C., and then, while maintaining the temperature, 133 g of trimethylolpropane (TMP) was dropped. After dropping was finished, the reaction temperature was maintained until the calculation value of isocyanate group concentration reached 33%. After the reaction was finished, the resultant product was purified using a thin film evaporator(TFE) to separate unreacted XDI and obtain a polyisocyanate composition.

Ethyl acetate was introduced to dilute such that a solid content of the obtained polyisocyanate composition became 75 wt %, and then, chromaticity, NCO content, 3XDI-1TMP content, and remaining XDI content were analyzed.

Example 2

A polyisocyanate composition was prepared by the same method as Example 1, except that 50 ppmw of butylated hydroxytoluene(BHT) was used as a stabilizer instead of phenol in Example 1.

Example 3

A polyisocyanate composition was prepared by the same method as Example 1, except that 100 ppmw of 2-[1-(2- hydroxy-3,5-di-tert-pentylphenyl)ethyl]-4,6-di-tert-pen-tylphenyl acrylate was used as a stabilizer instead of phenol in Example 1.

Example 4

A polyisocyanate composition was prepared by the same method as Example 1, except that a mixture of 500 ppmw of phenol and 100 ppmw of BHT was used as stabilizer instead of phenol in Example 1.

Example 5

A polyisocyanate composition was prepared by the same method as Example 1, except that a mixture of 500 ppmw of phenol and 300 ppmw of BHT was used as stabilizer instead of phenol in Example 1.

Example 6

A polyisocyanate composition was prepared by the same method as Example 1, except that 500 ppmw of octadecyl-3-(3,5-di-tert-butyl-4-hydroxyphenyl) propionate(Irganox 1076, produced by BASF) was used as stabilizer instead of phenol in Example 1.

Example 7

A polyisocyanate composition was prepared by the same method as Example 1, except that 500 ppmw of 6-[3-(3-tert-butyl-4-hydroxy-5-methylphenyl)propoxy]-2,4,8,10-tetra-tert-butyldibenz[d,f][1,3,2]dioxaphosphepine (SUM-ILIZER GP, produced by Sumitomo) was used as a stabilizer instead of phenol in Example 1.

Comparative Example 1

A polyisocyanate composition was prepared by the same method as Example 1, except that the amount of phenol was increased to 5000 ppmw and used as a stabilizer in Example 1.

Comparative Example 2

A polyisocyanate composition was prepared by the same method as Example 1, except that 5000 ppmw of BHT was used as a stabilizer instead of phenol in Example 1.

Comparative Example 3

A polyisocyanate composition was prepared by the same method as Example 1, except that a stabilizer was not used in Example 1.

Specifically, under nitrogen atmosphere, 1500 g of XDI was introduced into a round bottom flask and stirred. The temperature of the was raised to 70° C., and then, while maintaining the temperature, 133 g of TMP was dropped. After dropping was finished, the reaction temperature was maintained until the calculation value of isocyanate group concentration became 33%.

After the reaction was finished, the resultant product was purified using TFE to separate unreacted XDI and obtain a polyisocyanate composition.

Comparative Example 4

A polyisocyanate composition was prepared by the same method as Example 5, except that the stabilizer was introduced during the polymerization reaction, after dropping TMP.

Experimental Example

The polyisocyanate compositions prepared in Examples and Comparative Examples were diluted to a solid content of 75 wt % using ethyl acetate, and then, chromaticity, 3XDI-1TMP, NCO content and remaining XDI content were respectively measured as follows.

(1) Chromaticity

For the polyisocyanate compositions prepared in Examples and Comparative Examples, chromaticity was evaluated at 25° C. according to APHA method.

(2) 3XDI-1TMP Content

In order to confirm the content of the product(3XDI-1TMP) obtained by the reaction of 3 molecules of m-xy-lylene diisocyanate(3XDI) and 1 molecule of trimethylol-propane(1TMP), for the polyisocyanate composition sample prepared above, gel permeation chromatography(GPC) analysis was conducted under following conditions, and 3XDI-1TMP was measured from the result. The 3XDI-1TMP content in the polyisocyanate composition varies according to the introduction ratio of XDI and TMP, and it has an influence on the viscosities of the composition and the product prepared using the same. Thus, by confirming 3XDI-1TMP content in the polyisocyanate composition, viscosity may be controlled.

\<GPC Analysis Conditions\>

Device: Agilent Infinity 1260

Column: Styragel HR2+PLgel 5 μm+PLgel 5 μm

Sample concentration: 1 wt/vol %, prepared by dissolving 0.1 mg of the sample in 9.9 ml of tetrahydrofurane(THF))

Carrier: THF

Detection method: differential refractometer

Outflow: 1.0 ml/min

Column temperature: 35° C.

When drawing a calibration curve, polystyrene having molecular weight of 1000~20,000 g/mol was used.

(3) Isocyanate Group(NCO) Content:

To the polyisocyanate composition prepared above, 2N amine was introduced to neutralize isocyanate groups, and then, through back titration with 1N hydrochloric acid, the content of isocyanate groups, namely the rate of isocyanate groups based on the total weight of the polyisocyanate composition having a solid content of 75 wt % was shown as a percentage (NCO %).

(4) Remaining XDI Content:

The area rate of peak corresponding to XDI was calculated through HPC analysis, and the content of XDI remaining in the polyisocyanate composition was calculated therefrom. The remaining XDI content was shown in a percentage, based on the total weight of a solid content in the polyisocyanate composition.

TABLE 1

| | Stabilizer content in monomer composition (based on the total weight of XDI, ppmw) | Chromaticity (APHA) | 3XDI-1TMP (GPC area %) | NCO content (based on the composition with solid content of 75 wt %, wt %) | Remaining XDI content (based on the total weight of solid content in the composition, wt %) |
|---|---|---|---|---|---|
| Example1 | 25 | 18 | 54 | 12.3 | 0.3 |
| Example2 | 50 | 12 | 54 | 12.3 | 0.2 |
| Example3 | 100 | 20 | 54 | 12.1 | 0.3 |
| Example4 | 600 | 9 | 53 | 12.1 | 0.3 |
| Example5 | 800 | 6 | 53 | 12.0 | 0.3 |
| Example6 | 500 | 15 | 53 | 12.1 | 0.3 |
| Example7 | 500 | 4 | 53 | 12.2 | 0.2 |
| Comparative Example1 | 5000 | 106 | 52 | 11.7 | 0.3 |
| Comparative Example2 | 5000 | 80 | 51 | 11.2 | 0.3 |
| Comparative Example3 | — | 90 | 53 | 11.9 | 0.2 |
| Comparative Example4 | 800 | 52 | 53 | 11.9 | 0.2 |

As the results of experiments, it can be confirmed that the polyisocyanate compositions of Examples 1 to 7 exhibit chromaticity (APHA) of 30 or less, and thus, have lower APHA values compared to the composition of Comparative Example 3 wherein a stabilizer was not introduced. However, in case a stabilizer is excessively introduced as in Comparative Examples 1 and 2, due to the color of the stabilizer itself and thermal discoloration, APHA value significantly increased to the contrary. From these results, it can be seen that when introducing a stabilizer in a controlled content range, coloration and whitening inhibition effects can be realized.

And, from the significant increase in APHA value in Comparative Example 4 wherein a stabilizer was introduced during the polymerization reaction, it can be confirmed that the introduction time of a stabilizer has an influence on coloration and whitening inhibition effects.

The invention claimed is:

1. A method for preparing a polyisocyanate composition comprising the steps of:
   mixing aromatic diisocyanate and a phenol-based stabilizer to prepare a monomer composition; and
   adding polyhydric alcohol having two or more hydroxyl groups in the molecule to the monomer composition and conducting a polymerization reaction,
   wherein a mole ratio of hydroxyl groups in the polyhydric alcohol to isocyanate groups in the aromatic diisocyanate is 0.1 to less than 1, based on 1 mole of isocyanate group in the aromatic diisocyanate, and
   wherein the phenol-based stabilizer comprises a mixture of phenol and dibutylhydroxytoluene at a weight ratio of 10:1 to 5:3 and is used in an amount of 600 to 1000 ppmw, based on the total weight of the aromatic diisocyanate.

2. The method for preparing a polyisocyanate composition according to claim 1, wherein the aromatic diisocyanate comprises xylylene diisocyanate, diphenylmethane diisocyanate, bis (isocyanatophenyl) propane, diisocyanate anisole or a mixture thereof.

3. The method for preparing a polyisocyanate composition according to claim 1, wherein the polyhydric alcohol comprises trihydric alcohol; or a mixture of trihydric alcohol and polyhydric alcohol other than trihydric alcohol.

4. The method for preparing a polyisocyanate composition according to claim 1, wherein the polyhydric alcohol comprises diethylene glycol, glycerol, trimethylolethane, trimethylolpropane or a mixture thereof.

5. The method for preparing a polyisocyanate composition according to claim 1, wherein the polymerization reaction is conducted at 40 to 100° C. under inert gas atmosphere.

6. The method for preparing a polyisocyanate composition according to claim 1, further comprising a step of purifying the product of the polymerization reaction, after the polymerization reaction.

7. The method for preparing a polyisocyanate composition according to claim 6, wherein the purification is conducted by thin film evaporation.

* * * * *